United States Patent
Cole

Patent Number: 5,522,170
Date of Patent: Jun. 4, 1996

[54] FISHING LURE

[76] Inventor: Allan S. Cole, 1502 E. Avenue J-2, Lancaster, Calif. 93535

[21] Appl. No.: 402,351

[22] Filed: Mar. 10, 1995

Related U.S. Application Data

[63] Continuation-in-part of Ser. No. 213,460, Mar. 14, 1994, abandoned, which is a continuation of Ser. No. 979,763, Nov. 19, 1992, abandoned.

[51] Int. Cl.⁶ .................................................. A01K 85/00
[52] U.S. Cl. .......................................... 43/42.11; 43/42.15
[58] Field of Search .............................. 43/42.11, 42.15, 43/42.13, 42.16, 42.17, 42.24, 42.28, 42.22, 42.33

[56] References Cited

U.S. PATENT DOCUMENTS

| | | | |
|---|---|---|---|
| 1,402,798 | 1/1922 | Ryan | 43/42.15 |
| 1,545,683 | 7/1925 | Nowak . | |
| 1,557,644 | 10/1925 | Andersen | 43/42.15 |
| 1,607,107 | 11/1926 | Weller | 43/42.15 |
| 1,692,935 | 11/1928 | Heddon . | |
| 1,707,407 | 4/1929 | Miles . | |
| 1,791,316 | 2/1931 | Jordan | 43/42.15 |
| 1,828,574 | 10/1931 | Neukam . | |
| 2,069,972 | 2/1937 | Schroeder | 43/46 |
| 2,334,792 | 11/1943 | Royston | 43/42.15 |
| 2,441,302 | 5/1948 | Watkin | 43/42.15 |
| 2,597,792 | 5/1952 | Hardy | 43/42.15 |
| 2,691,235 | 10/1954 | Pcola | 43/26.2 |
| 3,423,868 | 1/1969 | Le Master | 43/42.33 |
| 3,426,467 | 2/1969 | Bryant | 43/42.28 |
| 3,727,339 | 4/1973 | Le Master | 43/42.22 |
| 4,044,492 | 8/1977 | Ingram | 43/42.28 |
| 4,477,994 | 10/1984 | Erickson | 43/42.44 |
| 4,654,995 | 4/1987 | Rapelje | 43/42.15 |
| 4,674,224 | 6/1987 | Williams | 43/42.22 |
| 5,119,581 | 6/1992 | Rudolph | 43/42.22 |

*Primary Examiner*—Maurina T. Rachuba
*Assistant Examiner*—Chuck Y. Mah
*Attorney, Agent, or Firm*—Christie, Parker & Hale

[57] ABSTRACT

A fishing lure with two articulated sections. The front section has a front face of a specific configuration either beveled or V-shaped. The rear end of the front section also has a specific configuration. The front end of the rear section has a configuration which mates with the rear end of the front section. The rear end of the rear section is tapered and a flexible tail piece is attached to the end of the rear section. A pivotable joint connects the front and rear sections together.

24 Claims, 4 Drawing Sheets

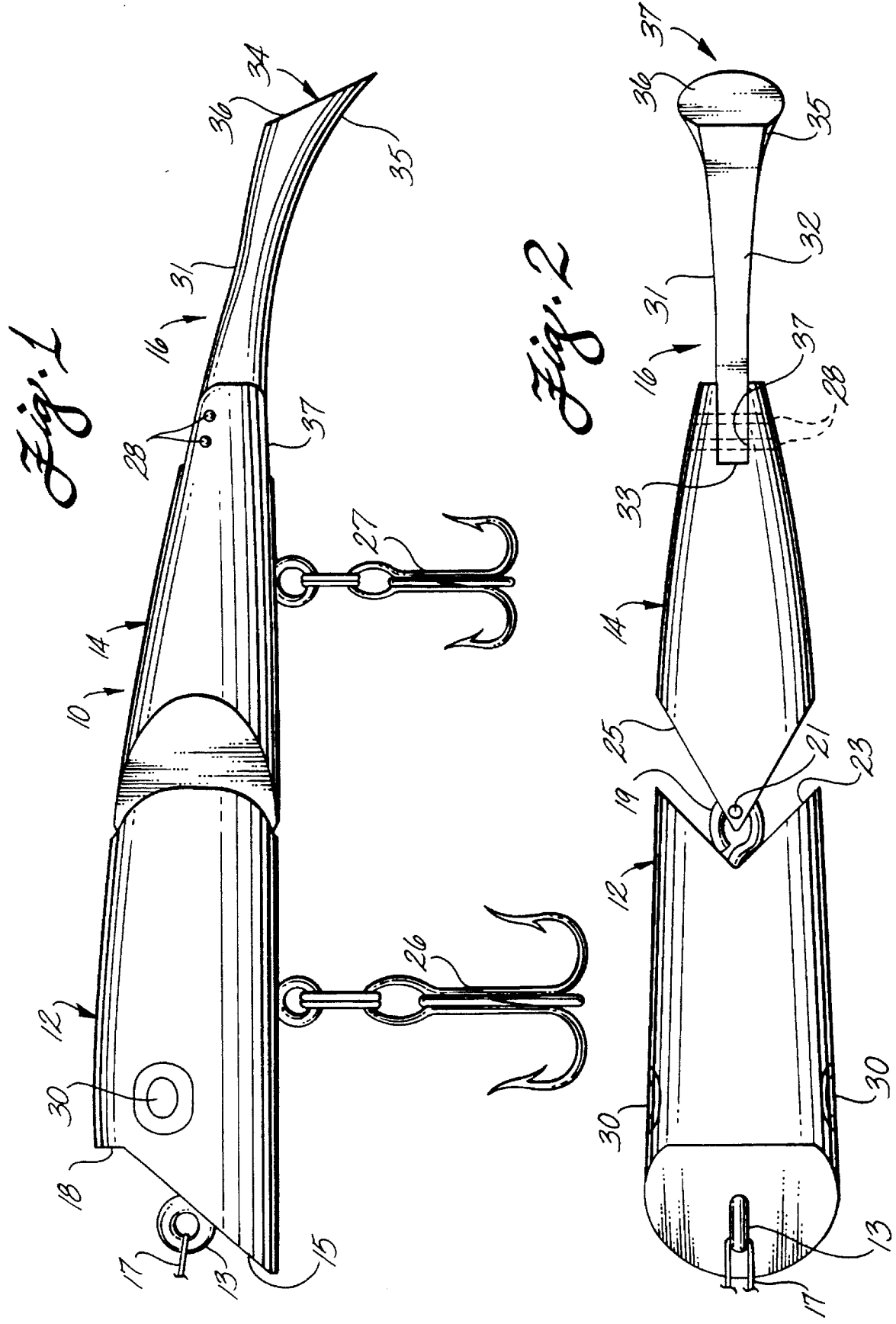

FISHING LURE

CROSS-REFERENCE TO RELATED APPLICATION

This is a continuation-in-part application of application Ser. No. 213,460, filed on Mar. 14, 1994, now abandoned, which was a continuation application of application Ser. No. 07/979,763, filed on Nov. 19, 1992, now abandoned.

BACKGROUND OF THE INVENTION

The present invention relates to fishing and fishing lures and in particular to a novel artificial lure used for bass fishing.

The attraction of fishing as a leisure time activity is well known. From the time of Isaac Walton and before, man has been attracted to the sport of fishing as a recreational activity and as a way of communing with nature. As is well known, fish are an illusive type of quarry and considerable skill is involved in being a successful fisherman.

For as long as fishing has provided man with a challenge, man has responded by many different kinds of apparatus for use in catching fish. Included in the various approaches that have been used are fish lures and attachments of many different types and designs, different types of bait, both live and artificial, different types of flies, both dry and wet, and finally a wide variety of artificial lures.

The challenge of fishing is not only to be successful in catching fish no matter what the size but also to attempt to catch fish of the largest possible size, so-called championship fishing.

SUMMARY OF THE INVENTION

The present invention provides an artificial fishing lure that comprises a body having a front section and a rear section with a flexible tail piece formed from a soft plastic or elastic material attached to the rear portion of the rear section. The front section includes a front face having a beveled portion in the form of a flat surface oriented in a downwardly facing direction. The front section has a generally cylindrical shape and a front end having a predetermined configuration. The rear end of the front section has a V-shaped configuration. A pivoting connection between the front and rear sections permits the lure to articulate at the joint between the first and second sections. The rear section has a generally cylindrical shape and a front end having a V-shaped configuration shape mating with the shape of the rear end of the first section. The rear end of the second section tapers to a relatively small cross section at the rear end thereof and attached to the rear end of the second section is a flexible tail piece consisting solely of a flexible homogenous material. The tail section has a fixed end that is non-movably attached to the rear end of the second section. The tail section also has a free end opposite the fixed end. The tail section is configured having a planer top surface that extends along the length of the tail from the fixed end to the free end. The free end includes a beveled or paddle shaped portion that extends outwardly away from a bottom portion of the tail section.

The particular design of the front section front face, the articulating joint between the front and rear sections, and the configuration of the flexible life-like tail act synergistically to provide a nervous, irregular, and erratic swimming movement, as the lure is pulled through the water, that simulates the motion of a weak or wounded fish, thereby making the lure attractive to fish.

In a first embodiment, the front face of the first section includes a beveled portion along a bottom portion of the front face that causes the lure to wobble from side to side with an irregular cadence swimming action as it is being drawn through the water. In a second embodiment, the front face of the first section has a completely angled surface to reduce the side-to-side motion of the lure somewhat and to produce more of an irregular wiggle wobble type action.

In a third embodiment, the front face of the first section includes a beveled portion along an upper portion of the front face to cause the lure to oscillate upward and downward as it is drawn through the water. In a fourth embodiment, the front face has a tapered or pointed shape and a beveled lip that extends outwardly and away from a bottom portion of the first section adjacent the front face. Like the first embodiment, the placement of the beveled lip in the forth embodiment also contributes to the synergistic action of the lure, which causes it to wobble erratically from side to side as it is pulled through the water.

In the presently preferred embodiment, a two or three pronged hook is attached to the bottom of the first section and a two or three pronged fish hook is attached to the bottom side of the second section. An eyelet is attached to the front face to provide the point of attachment of the lure to a fisherman's line.

BRIEF DESCRIPTION OF THE DRAWING

The foregoing and other features of the invention will be further understood by reference to the drawings wherein FIG. 1 is a side elevation of a first embodiment of the fishing lure according to the present invention;

FIG. 2 is a top view of the lure of FIG. 1;

DETAILED DESCRIPTION OF THE INVENTION

Figure 3:
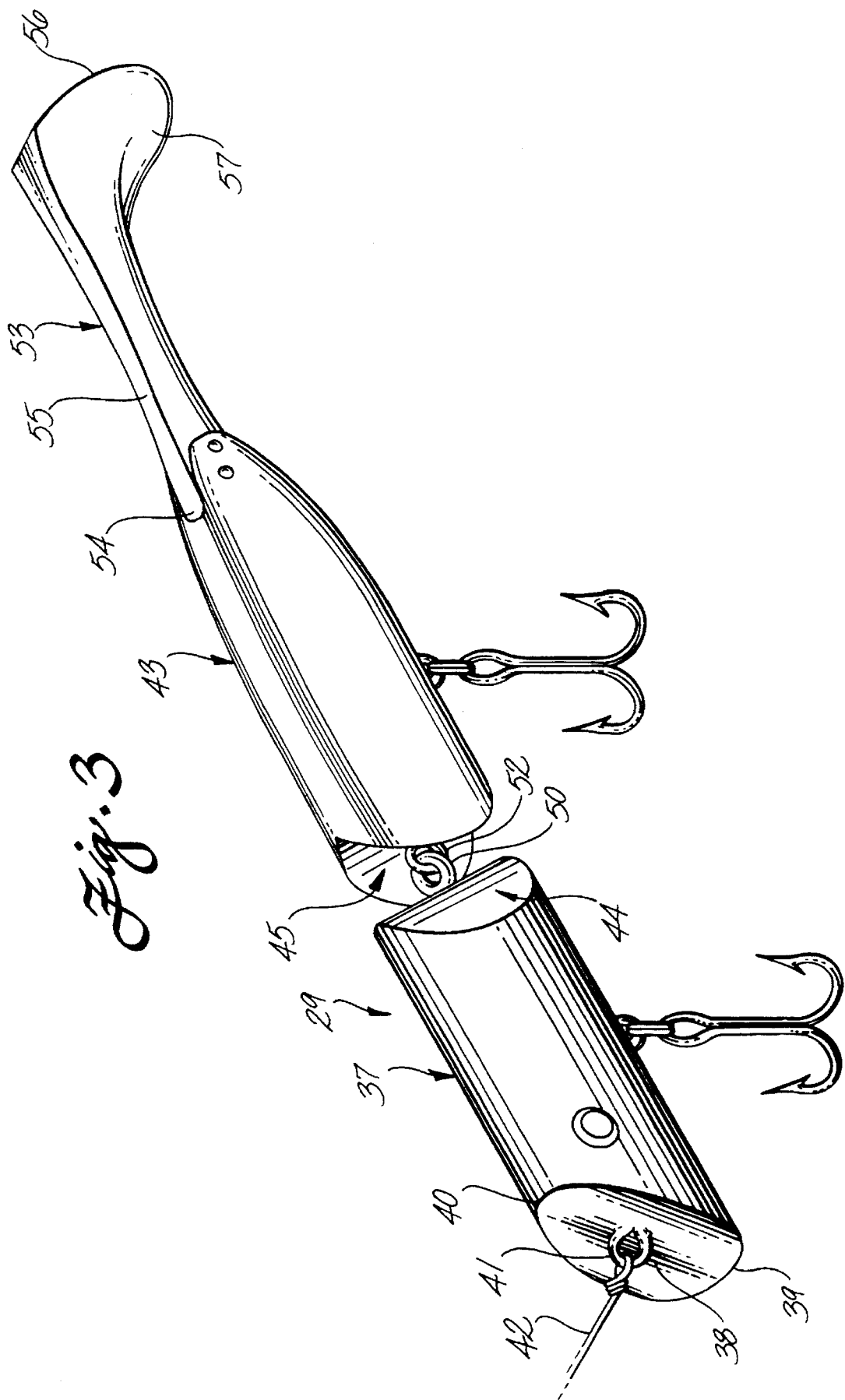
FIG. 3 is a perspective view of a second embodiment of a lure according to the present invention.

A first embodiment of a fishing lure 10 according to the present invention is shown in side view in FIG. 1 and in top view in FIG. 2. As shown therein, the lure 10 comprises a first or front section 12 and a second or rear section 14. An eyelet 13 is attached to the front end of lure 10 for attaching the lure to a fishing line 17. A eyelet 19 and a pin 21 combination are attached to the rear end of first section 12 and the front end of second section 14 respectively for connecting the front and rear sections together in a articulating manner. Fixedly attached to the rear end 27 of the rear section is an elongated flexible life-like tail element 16 having an extended narrow portion leading to a flattened beveled or paddle shaped portion at the free end thereof.

As shown in FIG. 1 the front end face of the front section 12 has a beveled or angled configuration imparted to it. The front face has a first relatively large flat beveled surface portion 15 extending up from the bottom of the lure at its leading edge and that defines a major surface portion of the front face. The beveled portion 15 joins a relatively short flat face 18 disposed at an angle thereto near the top of the lure. In a preferred first embodiment, the beveled surface portion 15 projects in a downward facing direction at an angle of approximately 45 degrees, and the short flat face 18 is oriented perpendicular to a horizontal axis that runs from the front to the rear of the lure. In a preferred first embodiment, the beveled surface portion 15 and the short flat face 18 are approximately 135 degrees apart from one another.

The rear end of the front section 12 has a V-shaped hidden joint cavity configuration 23 imparted to it. The front end of rear section 14 has a V-shaped wedge configuration 25 imparted to it such that it mates with the V-shaped rear end cavity of the front section. Eyelet 19 is secured to the rear end of front section 12 and pin 21 is secured to the front end of rear section 14 and passes through eyelet 19 causing the pin and eyelet to engage so as to provide the front and rear sections with an articulating joint.

The elongated flexible tail 16 is formed from a homogeneous soft elastic material such as plastic, synthetic rubber and the like, which produces a life-like wiggling movement when pulled through the water. The tail 16 has a long narrow body 31 having a planer top surface 32 and a semi-planer tapered bottom surface (not shown). The tail 16 includes a fixed end 33, at one end of the body 31, that is fixedly attached to a tapered rear end of the rear section 14, as further described below. The tail 16 includes a free end 34 at an opposite end of the body 31. The free end 34 comprises a beveled or paddle shaped portion 35 that extends outwardly away from the bottom surface of the tail body 31. The beveled portion 35 has a flat backside surface 36 that defines a terminal portion of the free end 34. The beveled portion has a flat backside surface that defines a terminal portion of the free end and forms a planar surface that intersects with the planar top surface of the tail section. The flat backside surface slopes downwardly toward a bottom edge of the tail end, moving from the top surface of the tail body. In a preferred embodiment, the planer top surface and the flat backside surface have an angular separation of in the range of from 225 to 255 degrees. In a particularly preferred embodiment, the planer top surface and the flat backside surface have an angular separation of approximately 240 degrees. The tail configured in the above-described manner does not resemble the tail of any small aquatic wildlife but, rather, is designed to contribute to the unique swimming action of the lure, as described in greater detail below. In a preferred embodiment, the tail is formed from plastisol which is a proprietary material produced by Worm King of Arleta, Calif.

A three pronged hook 26 is attached to the bottom of front section 12 of the lure and a three pronged hook 27 is attached to the bottom of rear section 14 of the lure. In pulling the lure through the water, the rear section 14 is caused to swing back and forth in an oscillating manner as the front section 12 is caused to move first left and then right under the impact of water pressing against the front face of the lure. The net result is that the action or movement of the lure as it is pulled through the water is highly unusual and does not resemble a regular oscillating rhythmic swimming movement of a healthy fish. Rather, as the lure is pulled through the water it produces an nervous irregular swimming action or cadence that simulates the swimming movement of a wounded or weak fish, thereby making the lure attractive to fish. No single feature alone, i.e., the design of the front face, the articulating front and rear sections, or the design of the elongated flexible tail, produces the above-described swimming movement. Rather, the particular movement of the lure is a synergistic effect of the combination of all of the design features working together.

The lure is finished by painting the body, for example with silver or a gray color and adding finishing coloring touches and markings to simulate the coloring and markings of small fish such as a small trout or the like. Enamels such as nail polish can be used for coloring. A coat of varnish can also be applied as a last step to seal the coloring and making and adding a sheen to the lure. Simulated fish eyes 30 are either attached to the sides of the front section adjacent the front face or are painted on to the sides of the front section in the place where fish eyes would normally be located.

The fixed end 34 of the tail 16 is non-movably attached to the tapered rear end of the rear section 14 by placing the fixed end into a notched out or slotted portion 37 of the rear end, such that the fixed end is enclosed within the notched out portion 37. One or more pins 28 are placed through the tapered rear end so that they pass through the notched out portion 37 and through the fixed end of the tail to fixedly secure the tail in place. The pins 28 are secured by interference fit within wall portions of the tapered rear end.

In FIG. 3 a second embodiment of a lure 29 according to the invention is shown. In comparison to the embodiment of the lure 10 shown in FIG. 1, the front face of the front section 37 is flat beveled or slightly concave surface 38 such that the leading edge 39 of the front face is located at the bottom of the lure and the trailing edge 40 of the front face is at the top of the lure. Such a configuration causes the lure to oscillate or wobble from side to side as it is pulled through the water.

An eyelet 41 used for attaching the lure to a fishing line 42 is attached to the lure at the front face thereof.

In the second embodiment shown in FIG. 3, the two sections of the lure 37 and 43 are modified so as to provide a V-shaped wedge 44 in the rear end of front section 37 and a V-shaped cavity 45 in the front end of the rear section 43 so as to again permit the front and rear sections to nest or dovetail together to form a hidden joint. Securing the two sections together, a pair of interlocking eyelets 50, 52 are provided to provide an articulating joint. Eyelet 50 is attached to rear end of front section 37 and eyelet 52 is attached to front end of rear section 43. The interlocking engagement of the eyelets permits articulating action of the front and rear sections with respect to one another.

The second embodiment comprises a flexible elongated tail 53 configured in the same manner as previously described for the first embodiment, including an elongated body 55 with planer top surface and partially planer tapered bottom surface, a fixed end 54 non-movably attached to the rear section 43, and a free end 56 having a beveled portion 57 that extends from a bottom surface of the tail body 55 and has a flat backside surface (not shown). Like the first embodiment, the combination of front face design, the articulating front and rear sections, and the elongated tail of the second embodiment act synergistically to produce an irregular swimming action when pulled through the water that simulates a wounded or weak fish.

Figure 4:
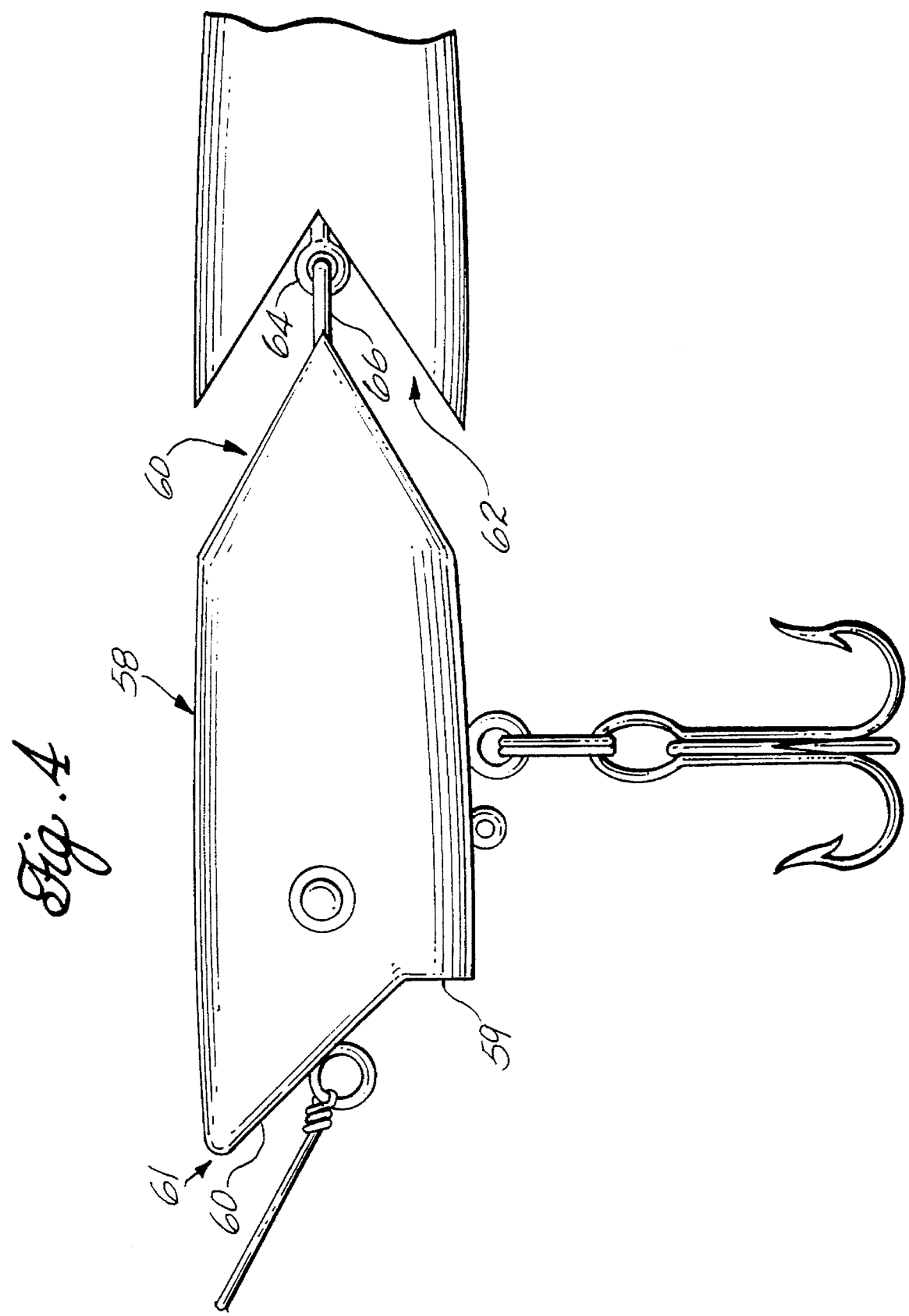
FIG. 4 is a side elevation of a third embodiment of the fishing lure according to the present invention.

A third embodiment of the invention is shown in FIG. 4. As shown therein, the angled configuration of the front face of the front section 58 has a relatively small flat surface 59 located at the bottom of the front face of the lure and a relatively large flat beveled surface 60 extending upwardly and forwardly to the top of the lure, making the top of the lure its leading edge 61. In this embodiment, the front section 58 has a V-shaped wedge 60 at its rear end in which a plane passing through the vertex of the V-shape is horizontally oriented. The front end of the rear section 57 has a V-shaped cavity configuration 62 in a mating horizontal orientation with wedge 60. The third embodiment also includes a flexible elongated tail that is configured in the same manner as that previously described and illustrated for the first and second embodiments of the fishing lure. The combination of front face, the articulating front and rear sections, and the elongated tail of the third embodiment act synergistically to produce an irregular swimming movement when pulled through the water that simulates a weak or wounded fish.

Figure 5:
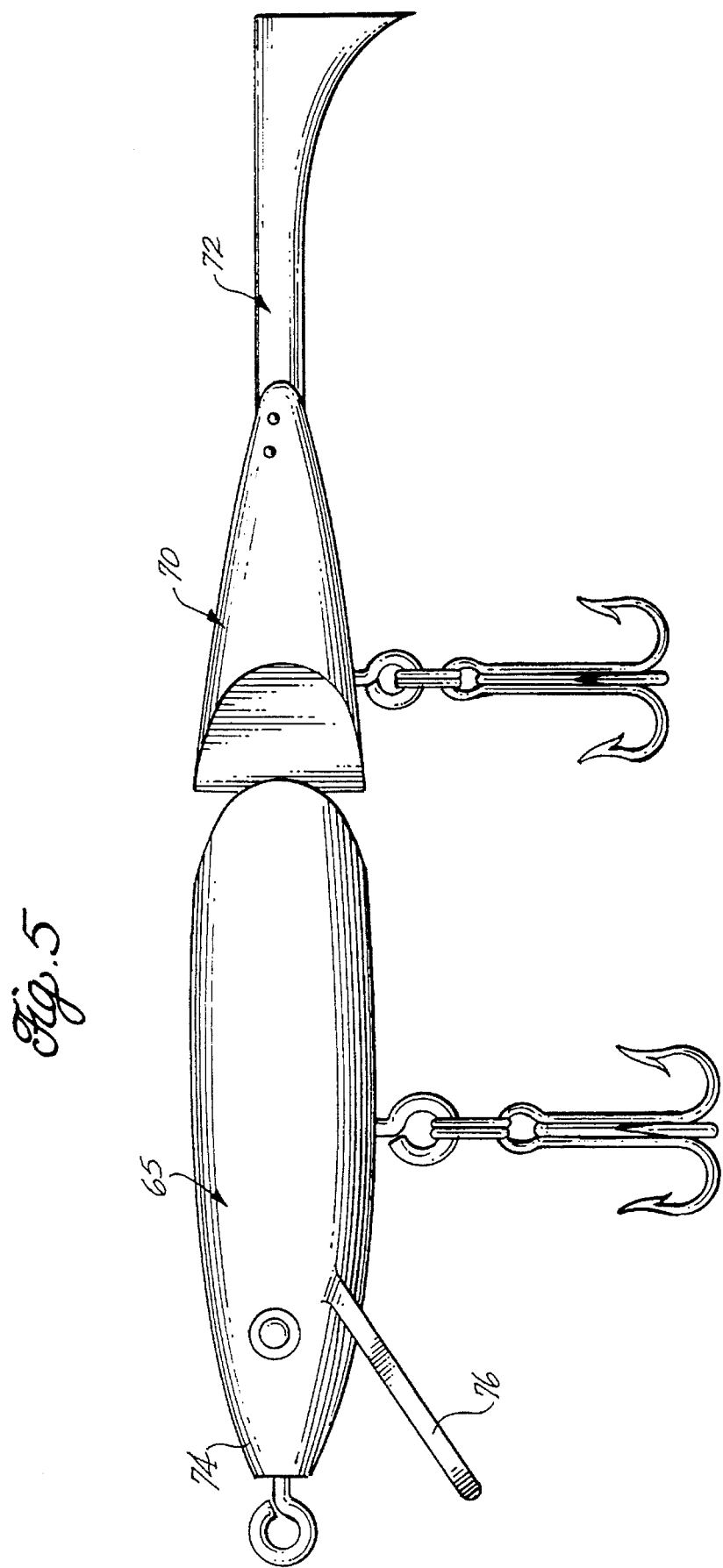
FIG. 5 is a side elevation of a fifth embodiment of the fishing lure according to the present invention.

FIG. 5 illustrates a fourth embodiment of the fishing lure according to principles of this invention comprising a front section 68, a rear section 70, and an elongated flexible tail piece 72. The front and rear sections are joined together in the same manner as that previously described and illustrated for the first and second embodiments, to provide articulating movement. The elongated tail 72 is also configured in the same manner previously described for the first and second embodiments. However, the front section 68 is configured differently than that described for the first and second embodiments, comprising a tapered almost pointed front face 74 and a beveled lip 76 that projects outwardly away from a bottom portion of the front section adjacent the front face.

The beveled lip 76 acts in the same manner as the beveled portion 15 of the front face in the first embodiment to contribute to a back and forth swimming motion of the lure as it is pulled through the water. The combination of features, i.e., the beveled lip, the articulating front and rear sections, and the elongated tail, act synergistically to produce an irregular swimming action or movement when the lure is pulled through the water that simulates a wounded or weak fish.

Although limited embodiments of a fishing lure have been specifically described and illustrated, it is to be understood that variations or alternative embodiments of the fishing lure apparent to those skilled in the art are within the scope of this invention. Since many such variations may be made, it is to be understood that within the scope of the following claims, this invention may be practiced otherwise than specifically described.

What is claimed is:

1. A fishing lure comprising:
   a front section simulating the front half of a small fish, wherein the front section includes a beveled portion positioned adjacent a front face;
   a rear section separate from the front section simulating the rear half of a small fish, wherein the rear section is connected to the rear end of the front section by means of an articulating joint, and wherein the rear section includes a tapered rear end:
   means for attaching fish line to the front face of the front section;
   at least one hook means attached to the lure;
   an elongated flexible tail section consisting solely of a flexible homogeneous material, wherein the tail section comprises:
      an elongated body;
      a fixed end defining one end of the body, wherein the fixed end is fixedly attached in a non-movable manner to the rear end of the rear section; and
      a free end defining an opposite end of the body, wherein the free end includes a beveled portion that extends outwardly away from a bottom portion of the body, and wherein the beveled portion has a flat backside surface that defines a terminal portion of the free end, whereby the lure produces an irregular swimming action when pulled through the water that simulates movement of a weak or wounded fish.

2. A fishing lure as recited in claim 1 wherein the beveled portion of the front section occupies a relatively major portion of the front face and has a downwardly sloping surface toward a bottom leading edge of the front face when moving from a top to a bottom portion of the front face, wherein the beveled portion intersects with a small flat portion that is positioned near a top portion of the front face, and wherein the beveled portion and the small flat portion of the front section are greater than 100 degrees apart from one another.

3. A fishing lure as recited in claim 2 wherein the beveled portion of the front section is positioned at an angle of approximately 45 degrees with respect to a horizontal axis running along the front section, and wherein the beveled portion and small flat portion of the front section are approximately 135 degrees apart from one another.

4. A fishing lure as recited in claim 1 wherein the beveled portion of the front section occupies a relatively major portion of the front face and has an upwardly sloping surface when moving from a bottom to a top portion of the front face, wherein the beveled portion of the front section intersects with a small flat portion that is positioned near a bottom portion of the front face, and wherein the beveled portion and the small flat portion of the front section are greater than 100 degrees apart from one another.

5. A fishing lure as recited in claim 4 wherein the beveled portion of the front section is positioned at an angle of approximately 45 degrees with respect to a horizontal axis running along the front section, and wherein the beveled portion and small flat portion of the front section are approximately 135 degrees apart from one another.

6. A fishing lure as recited in claim 1 wherein the beveled portion of the front section is in the form of a beveled lip that projects from a bottom surface of the front section adjacent the front face, wherein the beveled lip has a downwardly sloping surface directed toward the front face when moving downwardly from the bottom surface, and wherein the front face has a tapered shape.

7. A fishing lure as recited in claim 6 wherein the beveled lip projects from the bottom surface at an angle of approximately 45 degrees with respect to a horizontal axis running along the front section.

8. A fishing lure as recited in claim 1 wherein the tapered rear end of the rear section includes a notched portion, wherein the fixed end of the tail is disposed within the notched portion, and wherein the fixed end of the tail is fixedly attached within the notched portion.

9. A fishing lure as recited in claim 1 wherein the hook means comprises a first fish hook means attached to the bottom of the front section and a second hook means attached to the bottom of the rear section.

10. A fishing lure as recited in claim 1 wherein the elongated tail has a planer top surface extending from the fixed end to the free end, and has a partially planer bottom surface that is tapered toward the free end.

11. A fishing lure comprising:
    a front section simulating the front half of a small fish, wherein the front section has a front face comprising:
       a beveled portion defining a major portion of the front face, wherein the beveled portion slopes downwardly toward a bottom leading edge of the front face when moving from a top to a bottom portion of the front face; and
       a flat portion defining a minor portion of the front face positioned near the top of the front face, wherein the beveled portion extends from the bottom of the front face to intersect with the flat face, and wherein the beveled portion and flat portion are greater than 100 degrees apart from one another;

a rear section separate from the front section simulating the rear half of a small fish, wherein the rear section is connected to the rear end of the front section by means of an articulating joint, wherein the rear section includes a tapered rear end:

means for attaching fish line to the front face of the front section;

at least one hook means attached to the lure;

an elongated flexible tail section consisting solely of a flexible homogeneous material, wherein the tail section comprises:

an elongated body having a planer top surface;

a fixed end defining one end of the body, wherein the fixed end is fixedly attached in a non-movable manner to the rear end of the rear section; and a free end defining an opposite end of the body, wherein the free end includes a beveled portion that extends outwardly away from a bottom portion of the body, and wherein the beveled portion of the free end has a flat backside surface that defines a terminal portion of the free end, whereby the lure produces an irregular swimming action when pulled through the water that simulates movement of a weak or wounded fish.

12. A fishing lure as recited in claim 11 wherein the articulating joint comprises a first eyelet secured to the rear end of the front section and a second eyelet secured to the front end of the rear section.

13. A fishing lure as recited in claim 12 wherein the beveled portion and the flat portion of the front face are approximately 135 degrees apart from one another.

14. A fishing lure as recited in claim 11 wherein the hook means comprises a fishing hook with one or more prongs attached to a bottom surface of the front section, and a fishing with one or more prongs attached to a bottom surface of the rear section.

15. A fishing lure as recited in claim 11 wherein the tapered rear end of the rear section includes a notched portion, and wherein the fixed end of the tail is fixedly disposed within the notched portion.

16. A fishing lure comprising:

a front section simulating the front half of a small fish, wherein the front section has a V-shaped rear end configuration, and wherein the front section comprises:
a tapered front face;
a beveled lip projecting from a bottom surface of the front section adjacent the front face, wherein the beveled lip slopes downwardly toward the front face when moving downwardly away from the bottom surface;

a rear section separate from the front section simulating the rear half of a small fish, wherein the rear section is connected to the rear end of the front section by means of an articulating joint, said rear section having a V-shaped front end configuration that complements and fits into the V-shaped rear end of the front section, and wherein the rear section includes a tapered rear end:

means for attaching fish line to the front face of the front section;

at least one hook means attached to the lure;

an elongated flexible tail section consisting solely of a flexible homogeneous material, wherein the tail section comprises:

an elongated body having a planer top surface;

a fixed end defining one end of the body, wherein the fixed end is fixedly attached in a non-movable manner to the rear end of the rear section; and a free end defining an opposite end of the body, wherein the free end includes a beveled portion that extends outwardly away from a bottom portion of the body, and wherein the beveled portion of the free end has a flat backside surface that defines a terminal portion of the free end, whereby the lure produces an irregular swimming action when pulled through the water that simulates movement of a weak or wounded fish.

17. A fishing lure as recited in claim 16 wherein the beveled lip has a downwardly sloping surface of approximately 45 degrees with respect to a horizontal axis running along the front section.

18. A fishing lure as recited in claim 16 wherein tapered rear end of the rear section includes a notched portion, and wherein the fixed end of the tail is fixedly disposed within the notched portion.

19. A fishing lure as recited in claim 16 wherein the hook means comprises a fishing hook with one or more prongs attached to a bottom surface of the front section, and a fishing with one or more prongs attached to a bottom surface of the rear section.

20. A fishing lure comprising:

a front section simulating the front half of a small fish, wherein the front section has a front face comprising:
a beveled portion defining a major portion of the front face, wherein the beveled portion slopes upwardly toward a top leading edge of the front face when moving from a bottom to a top portion of the front face; and
a flat portion defining a minor portion of the front face, wherein the flat portion is positioned near the bottom of the front face, wherein the beveled portion extends from the bottom leading edge and intersects with the flat face, and wherein the beveled portion and flat portion of the front face are greater than 100 degrees apart from one another;

a rear section separate from the front section simulating the rear half of a small fish, wherein the rear section is connected to the rear end of the front section by means of an articulating joint, wherein the rear section includes a tapered rear end:

means for attaching fish line to the front face of the front section;

at least one hook means attached to the lure;

an elongated flexible tail section consisting solely of a flexible homogeneous material, wherein the tail section comprises:

an elongated body having a planer top surface;

a fixed end defining one end of the body, wherein the fixed end is fixedly attached in a non-movable manner to the rear end of the rear section; and a free end defining an opposite end of the body, wherein the free end includes a beveled portion that extends outwardly away from a bottom portion of the body, and wherein the beveled portion of the free end has a flat backside surface that defines a terminal portion of the free end, whereby the lure produces an irregular swimming action when pulled through the water that simulates movement of a weak or wounded fish.

21. A fishing lure as recited in claim 20 wherein the articulating joint comprises a first eyelet secured to the rear end of the front section and a second eyelet secured to the front end of the rear section.

22. A fishing lure as recited in claim 20 wherein the beveled portion and the flat portion of the front face are approximately 135 degrees apart from one another.

23. A fishing lure as recited in claim 20 wherein the hook means comprises a fishing hook with one or more prongs attached to a bottom surface of the front section, and a fishing with one or more prongs attached to a bottom surface of the rear section.

24. A fishing lure as recited in claim 20 wherein the tapered rear end of the rear section includes a notched portion, and wherein the fixed end of the tail is fixedly disposed within the notched portion.

* * * * *